L. EHLERS.
POT LID.
APPLICATION FILED JUNE 7, 1918.
1,328,652.
Patented Jan. 20, 1920.
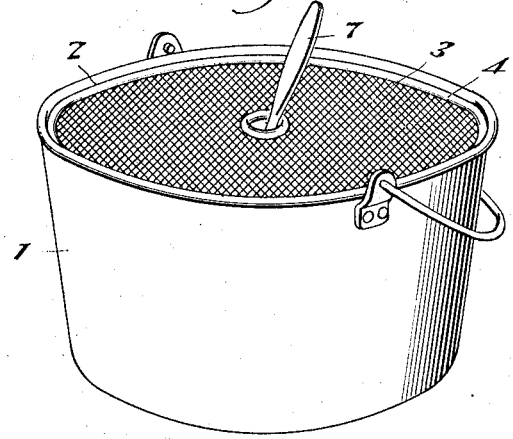
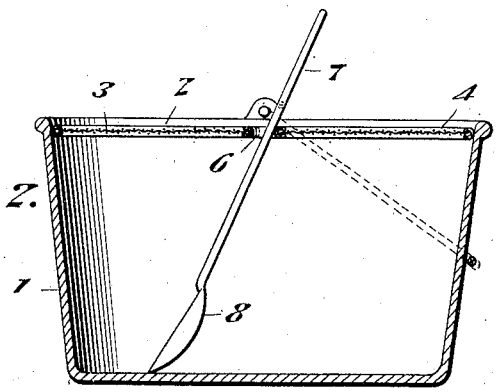
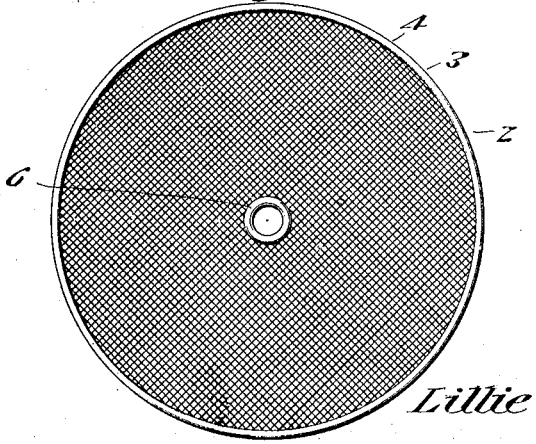
Witnesses
Inventor
Lillie Ehlers
By Victor J. Evans
Attorney

UNITED STATES PATENT OFFICE.

LILLIE EHLERS, OF STICKNEY, SOUTH DAKOTA.

POT-LID.

1,328,652.

Specification of Letters Patent. Patented Jan. 20, 1920.

Application filed June 7, 1918. Serial No. 238,697.

*To all whom it may concern:*

Be it known that I, Mrs. LILLIE EHLERS, a citizen of the United States, residing at Stickney, in the county of Aurora and State of South Dakota, have invented new and useful Improvements in Pot-Lids, of which the following is a specification.

This invention has reference to lids or covers for pots, boilers or the like.

The primary object of the invention is to produce a cover for this purpose having a body portion of reticulated material to permit of the free outlet of steam from the boiling water in the vessel, the edge of the reticulated body being protected by a ring member, and the center of the body being provided with an opening through which passes the handle of a spoon so that the contents of the kettle may be stirred without necessitating the removal of the cover from the vessel, and also whereby an outward pull on the handle of the spoon will cause the bowl thereof to contact with the inner face of the lid to permit of the withdrawal of the lid and spoon from a vessel.

Other objects and advantages will appear as the nature of the invention is better understood, reference being had to the accompanying drawings, in which, Figure 1 is a perspective view illustrating the application of the improvement.

Fig. 2 is an approximately vertical longitudinal sectional view through the same.

Fig. 3 is a plan view of the improvement.

Referring now to the drawings in detail the numeral 1 designates a pot or any other ordinary cooking vessel.

My improved cover is indicated broadly by the numeral 2 and comprises a flat reticulated body 3, which is round in plan. On the periphery of the body 3 is arranged a ring 4. The ring preferably has its inner edge formed with a continuous slot within which the edge of the body is received, and thereafter the ring is compressed against the body. The ring is provided with a coating of some suitable material to prevent the rusting thereof. The ring is designed to frictionally contact with the inner surfaces of the vessel 1, or if desired the same may rest upon the top of the vessel. The reticulated body permits of free outlet of steam from the boiling water in the vessel.

The body 3 is centrally provided with a round opening and the center edge of the said body is reinforced and protected by a metallic band 6 being arranged thereon. The band 6 is also preferably in the nature of a ring having its periphery provided with a continuous slot receiving the inner edge of the body and being compressed thereagainst. The band 6 is preferably round in cross section and is designed to have passed therethrough the handle portion 7 of a spoon 8. By this arrangement it will be noted that the spoon provides a means whereby the lid or cover may be arranged on or removed from the vessel without necessitating the direct contact of the hand of the cook with the lid or top. The arrangement also permits of the proper stirring of the material being cooked in the vessel, also without danger of the hand of the cook being scalded or injured from contact with the vessel, the top or the steam flowing through the reticulated top or lid.

It is believed, from the foregoing description, when taken in connection with the drawings that the simplicity and advantages of the construction will be apparent without further detailed description.

What I claim is:

1. A lid for vessels comprising a reticulated body, a peripheral reinforcement therefor, said body having a central opening, a reinforcing band surrounding the same and secured to the body, said band being of a size to receive therethrough the handle of a spoon.

2. In a pot lid, a body constructed of wire mesh and being round in plan, a non-reticulated ring having a continuous slot upon its inner surface receiving therein the peripheral edge of the body and the said ring being clamped around said body, said body having a central rounded opening therein and a metallic band having its outer periphery formed with a continuous slot receiving the inner edge of the body therein, said band being of a size to permit of the passage of the handle but not of the bowl of a spoon therethrough whereby an outward pull upon the handle will cause the bowl of the spoon to engage with the inner surface of the band to permit of the simultaneous withdrawal of the spoon and lid from a vessel.

In testimony whereof I affix my signature.

Mrs. LILLIE EHLERS.